May 27, 1930. F. J. GRABOWSKI 1,760,830
VELOCIPEDE CONSTRUCTION
Filed Aug. 24, 1927
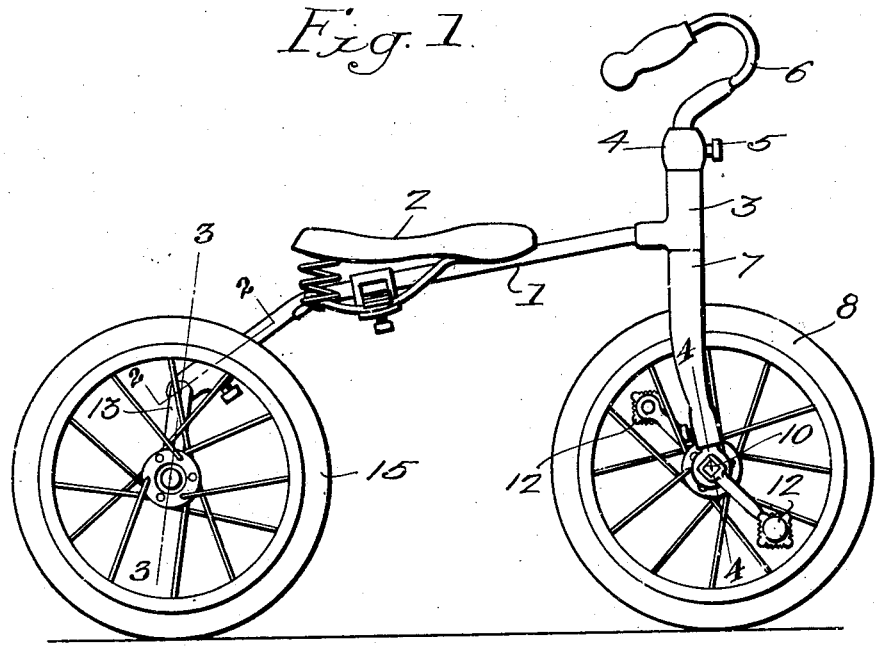
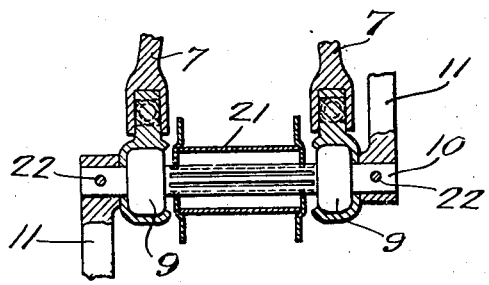
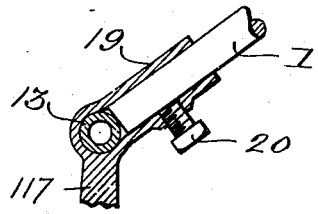
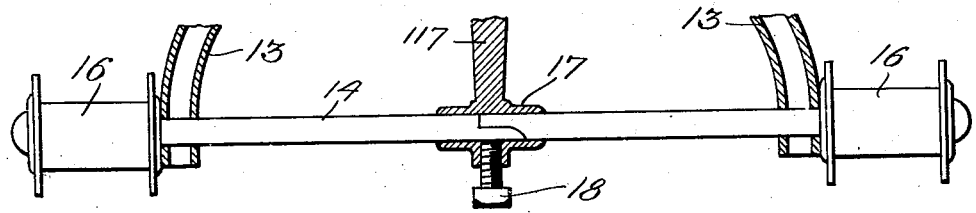
Inventor:-
Frank J. Grabowski
by his Attorneys
Howson & Howson Patented May 27, 1930

1,760,830

UNITED STATES PATENT OFFICE

FRANK J. GRABOWSKI, OF PHILADELPHIA, PENNSYLVANIA

VELOCIPEDE CONSTRUCTION

Application filed August 24, 1927. Serial No. 215,185.

This invention relates to improvements in velocipede construction, and one of the principal objects of the invention is to provide a novel form of knock-down frame which while having the requisite strength in assembly, permits the velocipede to be disassembled and packed for storage or shipment in a relatively small space.

Another object of the invention is to provide a novel front axle construction having certain advantages, as hereinafter set forth, over the prior methods of constructing this part.

In the attached drawings:

Figure 1 is a side elevation of a velocipede made in accordance with my invention;

Fig. 2 is a fragmentary sectional view on line 2—2 of Fig. 1 illustrating a detail of the invention;

Fig. 3 is a fragmentary section on the line 3—3, Fig. 1 illustrating further details, and Fig. 4 is a fragmentary section on the line 4—4, Fig. 1, illustrating details of the front axle.

With reference to the drawings, the velocipede comprises the usual frame consisting of a longitudinal bar 1 on which is adjustably mounted a seat 2 and which has at its forward end a vertical socket 3 through which extends a steering post 4. This post has detachably secured at the top, by means of a set screw 5, handle bars 6 and has at its lower end below the socket 3 the forked construction 7 of well known form which straddles the forward wheel 8 of the velocipede and which has at the lower end bearings 9 in which the axle 10, which carries the forward wheel, is journaled. The axle 10 has secured to its outer end cranks 11 having at their outer extremities pedals 12 by means of which the vehicle is propelled.

At the rear of the longitudinal frame bar 1 is a transverse bar 13 whose outer ends extend downwardly and constitute a support for a rear axle bar 14. On the projecting ends of this bar are journaled the rear wheels 15, the hubs of these wheels being designated in Fig. 3 by the reference numeral 16. As shown in this latter figure, the rear axle bar 14 is made in two sections whose inner ends fit together in overlapped relation and are rigidly secured in a socket 17 depending from the center of the transverse frame bar 13 by means of a set screw 18 which is threaded in the present instance into the bottom of the socket 17 and clamps the overlapping inner ends of the sections of the shaft 14 in the socket.

As shown in Fig. 2, the rear end of the longitudinal frame bar 1 fits in a socket 19 on the transverse cross bar 13, this socket 19 being formed in an integral fixture 117 secured to the transverse bar 13 and extending downwardly from the latter to include the socket 17 for the rear axle. A set screw 20 clamps the frame bar 1 in the socket 19.

With the foregoing construction, it will be apparent that the entire rear of the velocipede including the transverse bar 13 and the rear wheels may be detached from the longitudinal bar 1 by loosening the set screw 20. Also the rear wheels and axle may be removed from the associated parts of the frame by releasing the set screw 18 and withdrawing the rear axle sections. The handle bars also are removable by releasing the set screw 5 which permits the velocipede to be packed or stored in a substantially flat package or space and in very compact form. The construction also greatly facilitates the operations of assembling and disassembling the velocipede.

In addition to the foregoing novel structural features, I prefer to employ, as illustrated in Fig. 4, a front axle member 10 in the form of a rectangular bar, the hub 21 of the front wheel having rectangular openings through which the axle 10 is inserted, the hub being fixed to the axle longitudinally by welding or in any other desirable manner.

The bearings 9 for the front wheel may be of the standard ball-bearing type and may directly surround the rectangular axle which turns freely in the bearings in the usual manner. The cranks 11 at the extremities of the shaft are preferably secured to the latter by means of pins 22 driven through the parts or by means of screws or in any other desired manner.

The use of the rectangular axle affords a material simplification of the construction, and is further advantageous in that it affords a better and more efficient bearing between the cranks 11 and the shaft which is entirely independent of the elements by means of which the cranks are secured on the shaft.

I claim:

1. A velocipede comprising a longitudinal frame bar having an upright socket at the front, a shaft journaled in the socket and having a bifurcated section at the bottom in and between which the forward wheel of the velocipede is journaled and having at the top means for rotating the shaft to guide the vehicle, a transverse bar detachably secured at the rear of said longitudinal bar, an axle supported in said transverse bar, and rear wheels journaled on the axle.

2. A velocipede comprising a longitudinal frame bar having an upright socket at the front, a shaft journaled in the socket and having a bifurcated section at the bottom in and between which the forward wheel of the velocipede is journaled and having at the top means for rotating the shaft to guide the vehicle, a transverse bar detachably secured at the rear of said longitudinal bar, an axle detachably mounted in said transverse bar, and rear wheels journaled on the axle.

3. A velocipede comprising a longitudinal frame bar having an upright socket at the front, a shaft journaled in the socket and having a bifurcated section at the bottom in and between which the forward wheel of the velocipede is journaled and having at the top means for rotating the shaft to guide the vehicle, a rear transverse frame piece secured at the rear of said longitudinal bar and including depending end and center portions, an axle supported in said end and center portions, and rear wheels journaled on the axle.

4. A velocipede comprising a longitudinal frame bar having an upright socket at the front, a shaft journaled in the socket and having a bifurcated section at the bottom in and between which the forward wheel of the velocipede is journaled and having at the top means for rotating the shaft to guide the vehicle, a rear transverse frame piece secured at the rear of said longitudinal bar and including depending apertured end and center portions, an axle including independent sections insertible respectively through the apertures in said end portions and into said center portion, means for detachably securing the axle sections in the center portion, and wheels journaled on the axle.

5. A velocipede comprising a frame, a rear axle mounted in the frame, wheels journaled on the axle, an upright steering post journaled in the front of the frame and having a lower forked portion, aligned ball-bearings in said forks, a polygonal shaft journaled in the bearings, a wheel mounted on the shaft, and pedal cranks fitted on the projecting ends of the shaft and constituting the means for propelling the vehicle.

FRANK J. GRABOWSKI.